United States Patent
Boucard

(10) Patent No.: US 12,461,536 B2
(45) Date of Patent: Nov. 4, 2025

(54) PERSONAL ROBOT

(71) Applicant: TESSERACT VENTURES, LLC, Overland Park, KS (US)

(72) Inventor: John Boucard, Overland Park, KS (US)

(73) Assignee: TESSERACT VENTURES, LLC, Overland Park, KS (US)

( * ) Notice: Subject to any disclaimer, the term of this patent is extended or adjusted under 35 U.S.C. 154(b) by 233 days.

(21) Appl. No.: 17/920,124

(22) PCT Filed: Apr. 23, 2021

(86) PCT No.: PCT/US2021/028942
§ 371 (c)(1),
(2) Date: Oct. 20, 2022

(87) PCT Pub. No.: WO2021/217068
PCT Pub. Date: Oct. 28, 2021

(65) Prior Publication Data
US 2023/0176585 A1    Jun. 8, 2023

Related U.S. Application Data

(60) Provisional application No. 63/015,194, filed on Apr. 24, 2020.

(51) Int. Cl.
*B25J 5/00* (2006.01)
*B25J 11/00* (2006.01)
*G05D 1/00* (2006.01)

(52) U.S. Cl.
CPC ............ *G05D 1/0274* (2013.01); *B25J 5/007* (2013.01); *B25J 11/008* (2013.01)

(58) Field of Classification Search
CPC ........ G05D 1/0274; B25J 5/007; B25J 11/008
See application file for complete search history.

(56) References Cited

U.S. PATENT DOCUMENTS

| | | | |
|---|---|---|---|
| 2016/0274580 A1* | 9/2016 | Jung | G05D 1/0033 |
| 2017/0217027 A1 | 8/2017 | Boucard | |
| 2017/0327091 A1* | 11/2017 | Capizzo | H01M 10/30 |
| 2017/0358201 A1* | 12/2017 | Govers | G05D 1/0248 |
| 2018/0088583 A1* | 3/2018 | Wang | G05D 1/0217 |
| 2019/0160190 A1 | 5/2019 | Kreitenberg | |
| 2019/0200510 A1* | 7/2019 | Chrysanthakopoulos | A01B 59/043 |
| 2019/0248007 A1* | 8/2019 | Duffy | B25J 15/0066 |

(Continued)

OTHER PUBLICATIONS

International Search Report and Written Opinion for International application No. PCT/US2021/028942, mailed Jul. 20, 2021, 11 pages.

(Continued)

*Primary Examiner* — Khoi H Tran
*Assistant Examiner* — Tien Minh Le
(74) *Attorney, Agent, or Firm* — Polsinelli PC

(57) ABSTRACT

A robot assembly operable to couple to one or more accessories including a housing coupled with two wheels and at least one electric motor operably coupled with the plurality of wheels. A navigation system can have one or more sensors operably disposed within the housing and the navigation system can be operable to receive data from the one or more sensors and communicatively couple with the at least one electric motor.

19 Claims, 9 Drawing Sheets

(56) References Cited

U.S. PATENT DOCUMENTS

| | | | |
|---|---|---|---|
| 2019/0262687 A1* | 8/2019 | LoDuca | A63B 69/0075 |
| 2020/0038274 A1* | 2/2020 | Augustine | A61M 16/06 |
| 2020/0225673 A1* | 7/2020 | Ebrahimi Afrouzi | G06N 5/04 |
| 2021/0077651 A1* | 3/2021 | Romo | A61L 2/10 |
| 2021/0132607 A1* | 5/2021 | Maeng | G05D 1/0238 |
| 2021/0290796 A1* | 9/2021 | Gillespie | A61L 2/202 |

OTHER PUBLICATIONS

Mielle et al., "The Auto-Complete Graph: Merging and Mutual Correction of Sensor and Prior Maps for SLAM", Robotics, 29, May 2019, retrieved on [Jun. 2, 2021]. retrieved from the Internet <URL: http://www.mdpi.com/2218-6581/8/2/40> entire document.

\* cited by examiner

PERSONAL ROBOT

CROSS-REFERENCE TO RELATED APPLICATIONS

The present application claims priority to International Application Number PCT/US2021/028942, which was filed on Apr. 24, 2021, which claims the benefit of U.S. Provisional Application 63/015,194, filed Apr. 23, 2020, the contents of which are incorporated by reference in their entirety.

BACKGROUND

1. Field of the Invention

The present inventive concept relates generally to a self-propelled robot. More specifically to a self-propelled robot couplable with one or more accessory.

2. Description of Related Art

Robotics is an evolving art and self-propulsion and navigation by a robot can allow a robot to perform tasks independent of an operator; however, robots are generally designed to perform a specific task. This arrangement allows a robot to efficiently perform a task, but limit the flexibility and usability of a robot to perform a variety of tasks an operator may need assistance with over the course of an operation.

BRIEF DESCRIPTION OF THE DRAWINGS

The novel features of the disclosure are set forth with particularity in the appended claims. A better understanding of the features and advantages of the present inventive concept will be obtained by reference to the following detailed description that sets forth illustrative examples, in which the principles of the disclosure are utilized, and the accompanying drawings of which:

DETAILED DESCRIPTION

Figure 1:
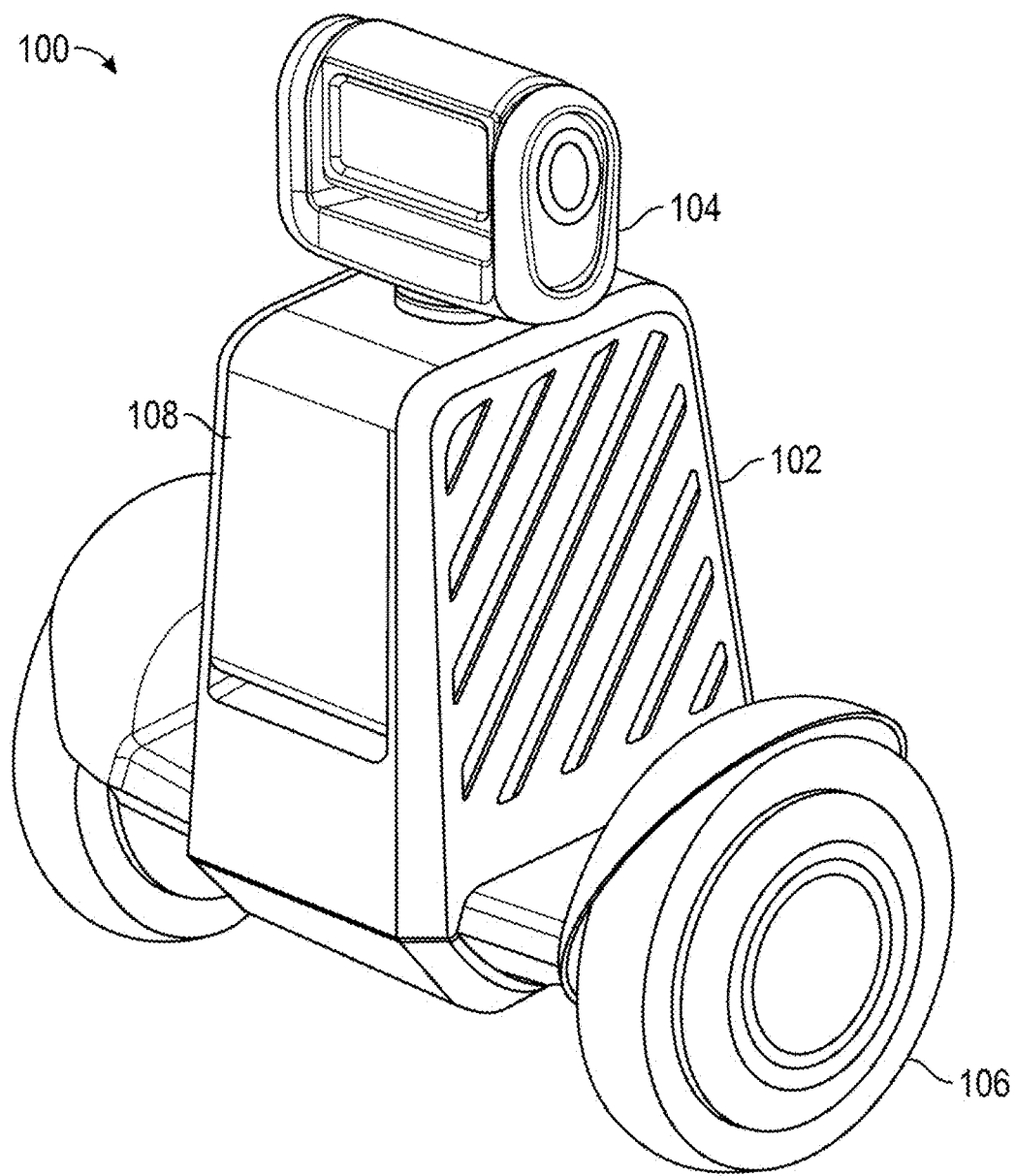
FIG. 1 is a diagrammatic view of a robot assembly, according to at least one instance of the present disclosure.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

I. Terminology

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

II. General Architecture

The apparatus, systems and methods disclosed herein relate to a modular, interactive robotic platform operable to couple to a self-propelled backpack assembly and/or one or more modular accessory elements. The self-propelled backpack assembly can have one or more motors operable to power two or more drive wheels, a power storage system, and a navigation system.

Figure 2:
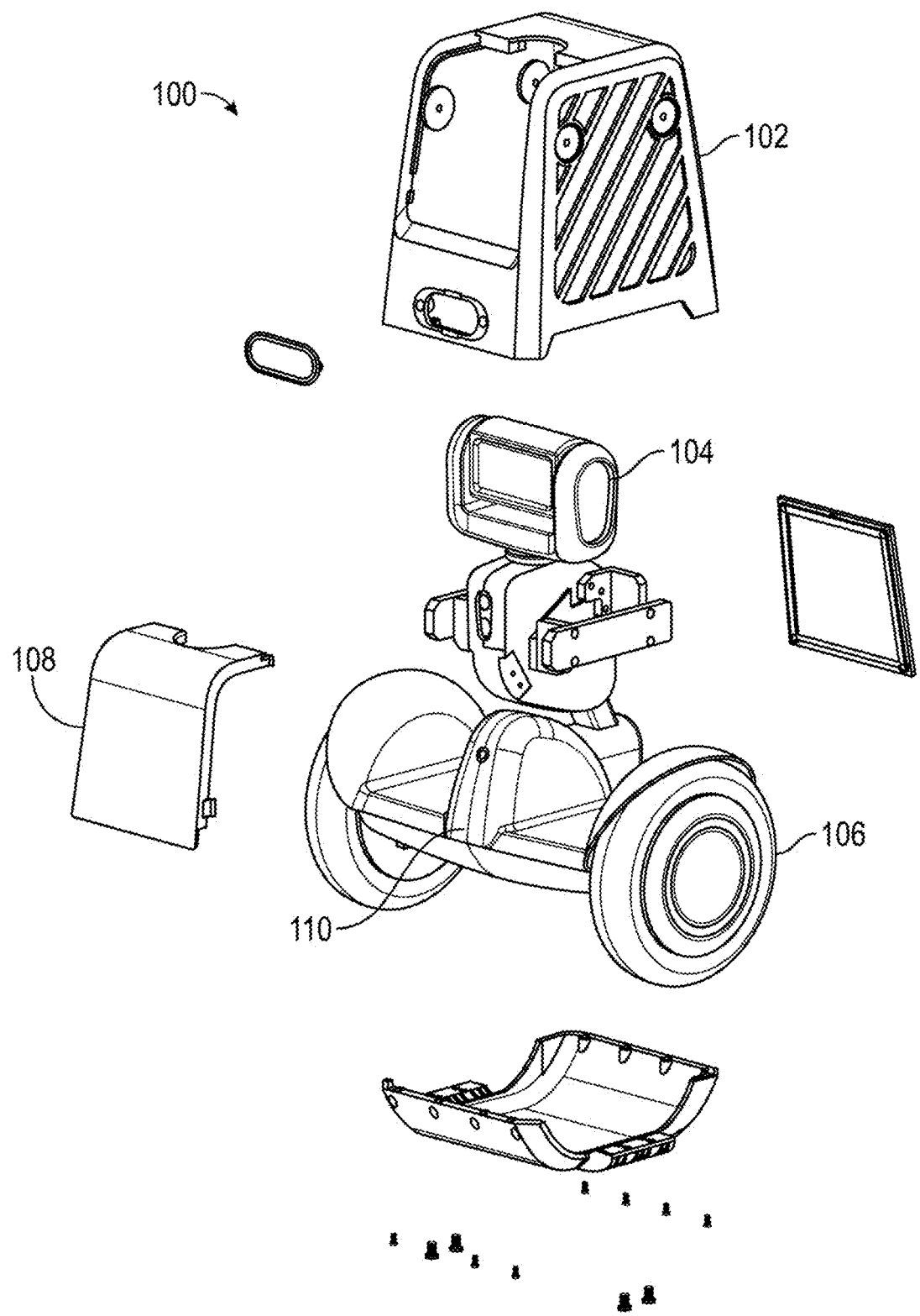
FIG. 2 is an exploded view of a robot assembly, according to at least one instance of the present disclosure.

FIG. 1 illustrates a diagrammatic view of a robot assembly according to at least one instance of the present disclosure. FIG. 2 illustrates a diagrammatic view of a robot assembly according to at least one instance of the present disclosure. The robot assembly 100 can include a housing 102, a navigation system 104, and a plurality of wheels 106. The robot assembly 100 can be operable to follow a user and/or self-navigate to assist in user operations. As discussed below with respect to FIGS. 3-7C, the robot assembly 100 can be modularly couplable with one or more accessory components operable to assist a user in with a specific operation.

The housing 102 can have a front panel 108 formed of a transparent and/or translucent material operable to allow one or more sensors of the navigation system 104 to operate therethrough. The front panel 108 can allow IR, laser, video, camera, and/or other signals to interact with the navigation system 104, while shielding the one or more sensors from environmental conditions (e.g. rain, water, dust, debris, and/or environmental hazards, etc.) during operation of the robot assembly 100. In at least one instance, the front panel 108 can extend around at least a portion of an adjacent surface (including the top and/or bottom) to maximize field of view for the navigation system 104.

The housing 102 can be operable to receive one or more components therein including, but not limited to, one or more elements of the navigation system 104, one or more electric motors 110, power storage systems, random access memory (RAM), read-only memory (ROM), one or more printed circuit boards (PCB) and/or one or more processors. The one or more electric motors can be operably coupled with one or more of the plurality of wheels 106 to provide motive power thereto. While FIG. 1 and FIG. 2 illustrates the plurality of wheels as a substantially disc shaped wheel, it is within the scope of the present disclosure to implement any shape wheel and/or motive element, including, but not limited to, spherical wheels, belt tracks, and/or cylindrical wheels. The plurality of wheels 106 can be solid surface material, inflatable tires, and/or combinations thereof.

The RAM, ROM, PCB, and/or one or more processors can be operably coupled with one or more of the navigation system 104, the one or more electric motors, and/or the plurality of wheels 106, thereby allowing control of variation in speed, direction, distance, and/or acceleration.

The navigation system 104 can include, but is not limited to, one or more cameras, one or more light detection and ranging (LiDAR) systems, one or more proximity sensors, and the like. At least a portion of the navigation system 104 can be arranged behind the front panel 108, thereby providing environmental protection for one or more sensitive sensors. The one or more sensors of the navigation system 104 can be operable to generate a mapping of at least a portion of the surrounding environment relative to the personal robot assembly. In at least one instance, the mapped environment can be a point-cloud and/or grid based point mapping of one or more elements detected by the one or more sensors relative to the personal robot assembly 100.

The navigation system 104 can be coupled with the one or more RAM, ROM, PCB, and/or one or more processors to map, measure, and/or navigate an environment of the robot assembly. The navigation system 104 can implement a camera operable to track an operator and maintain a predetermined distance between the operator and the robot assembly 100 including varying speed, acceleration, and/or distance to maintain the predetermined distance while avoiding obstacles. In at least one instance, the robot assembly 100 can be operable to follow the same path taken by the operator while maintaining the predetermined distance therebetween. In other instances, the robot assembly 100 can be operable to maintain the predetermined distance while following a path determined by the navigation system 104 that may or may not correspond with the operator's travel path.

The navigation system 104 can implement the one or more cameras and/or LiDAR systems operable to generate a mapping of an environment, thereby allowing present and/or future navigation of the environment. The mapping of the environment can be a complete mapping of the robot assembly 100 environment and/or a portion of the environment associated with the direction of travel and/or recent locations. In at least one instance, the navigation system 104 can operably store one or more mapped environments in the RAM and/or ROM for later use. In some instances, the navigation system 104 can compare current mapping data to previously stored mapped environments to determine and/or confirm location of the robot assembly 100 within a previously mapped environment.

The navigation system 104 can be operable to allow the robot assembly 100 to self-navigate an environment, including obstacle avoidance, and/or follow an operator while monitoring a surrounding environment for obstacles and/or potential obstacles including based on active mapping data and/or previously mapped, saved environment data. In at least one instance of the present disclosure, a robot assembly 100 can map an environment and communicate the mapped environment to one or more other robot assemblies 100 within a plurality of robot assemblies 100.

The navigation system 104 of the robot assembly 100 can be operable to follow an operator and maintain a predetermined distance between the operator and the robot assembly 100. The predetermined distance can be adjusted by the operator depending on the environment, desired task, and/or personal preference. In at least one instance of the present disclosure, the navigation system 104 is operable to maintain the robot assembly 100 at the predetermined distance relative to the operator in a linear direction (e.g. "as the crow flies"). In other instances, the navigation system 104 of the robot assembly 100 can be operable to maintain the robot assembly 100 at the predetermined distance along a non-linear pathway followed by the operator. The navigation system 104 of the robot assembly 100 can be operable to map the operator's path and the robot assembly 100 can be operable to follow substantially the same pathway while maintaining the predetermined distance. In at least one instance, the robot assembly 100 can be communicatively coupled to one or more sensors associated with the user including, but not limited to, personal electronic devices (e.g, cellphone, laptop computer, tablet, fob, etc.) and the one or more sensors can provide location data and/or environmental data associated with the operator to the navigation system 104 and/or the robot assembly 100. In other instances, the robot assembly 100 can track, monitor, and/or follow the operator with one or more of the one or more sensors integrated therewith.

In one instance, an operator may be a painter painting the outside of a large building while the robot assembly 100 carries supplies and/or equipment for the painter (e.g. paint, paint rollers, paint sprayer, brushes, rags, cleaning solutions, ladders, etc.). The robot assembly 100 operably maintaining the predetermined distance can allow the painter to keep moving along the surface to be painted without having to pause and reposition supplies and/or equipment.

The navigation system 104 can utilize one or more of the RAM, ROM, PCBs, and/or one or more processors of the robot assembly 100. The navigation system 104 can also include one or more RAM, ROM, PCBs, and/or one or more processors associated therewith and operably coupled with one or more the RAM, ROM, PCBs, and/or one or more processors of the robot assembly 100. The one or more processors, RAM, ROM, and/or PCBs can be implemented to store and implement instructions of the personal robot assembly relating to mapping the environment, navigating the environment, determining a position within the environment, and/or the like.

In some instances, the robot assembly 100 can have two wheels 106 and further include one or more gyroscopes operable to assist in maintaining the robot assembly 100 upright. The robot assembly 100 can be weighted and arranged to maintain an upright position; however, during motion and/or starting and stopping motion, the one or more gyroscopes can assist in maintaining the upright position including by adjusting position and/or orientation of the personal robot assembly.

Figure 3:
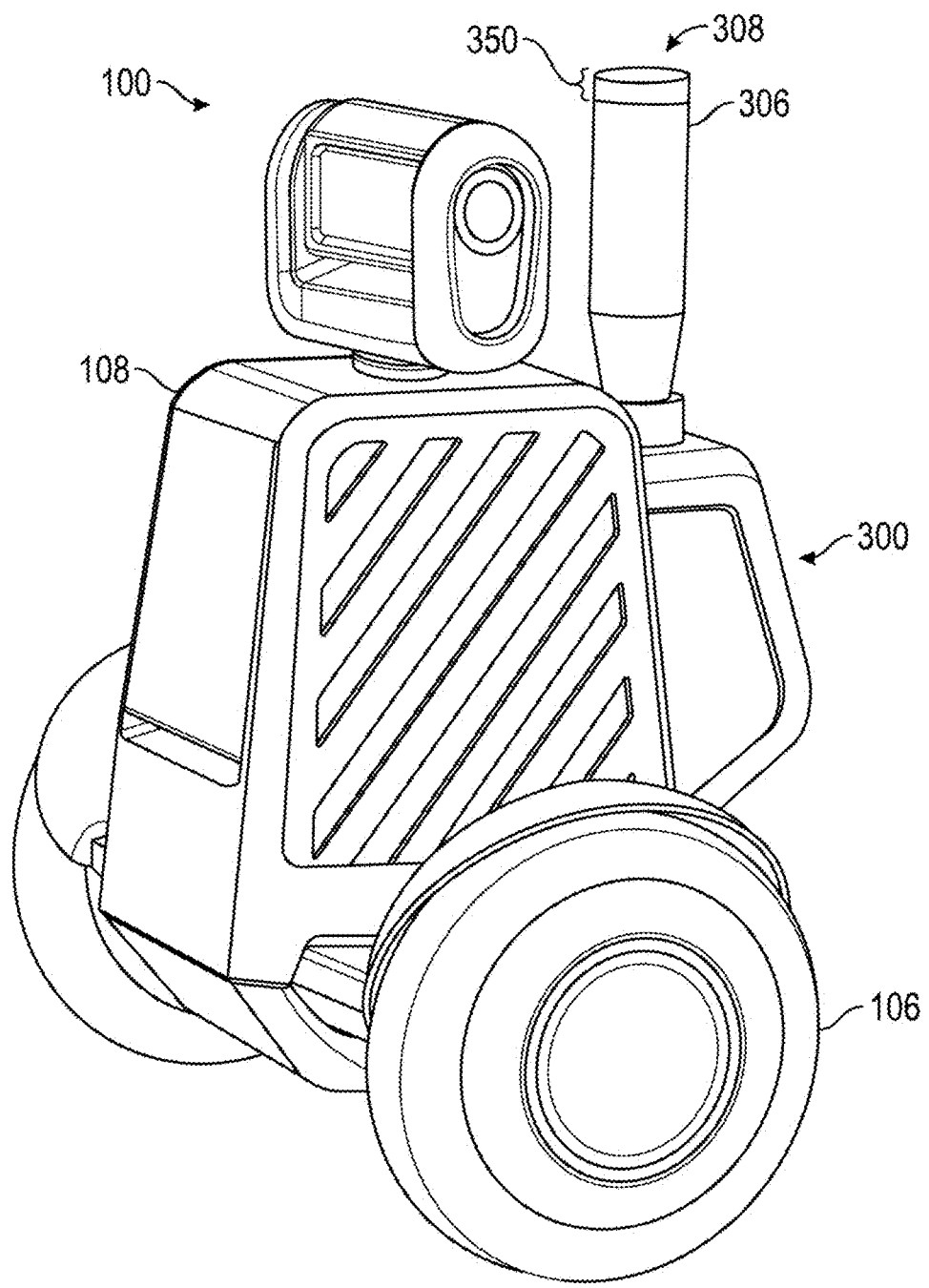
FIG. 3 is a diagrammatic view of an actuator backpack assembly coupled with the backpack robot assembly, according to at least one instance of the present disclosure.
Figure 4:
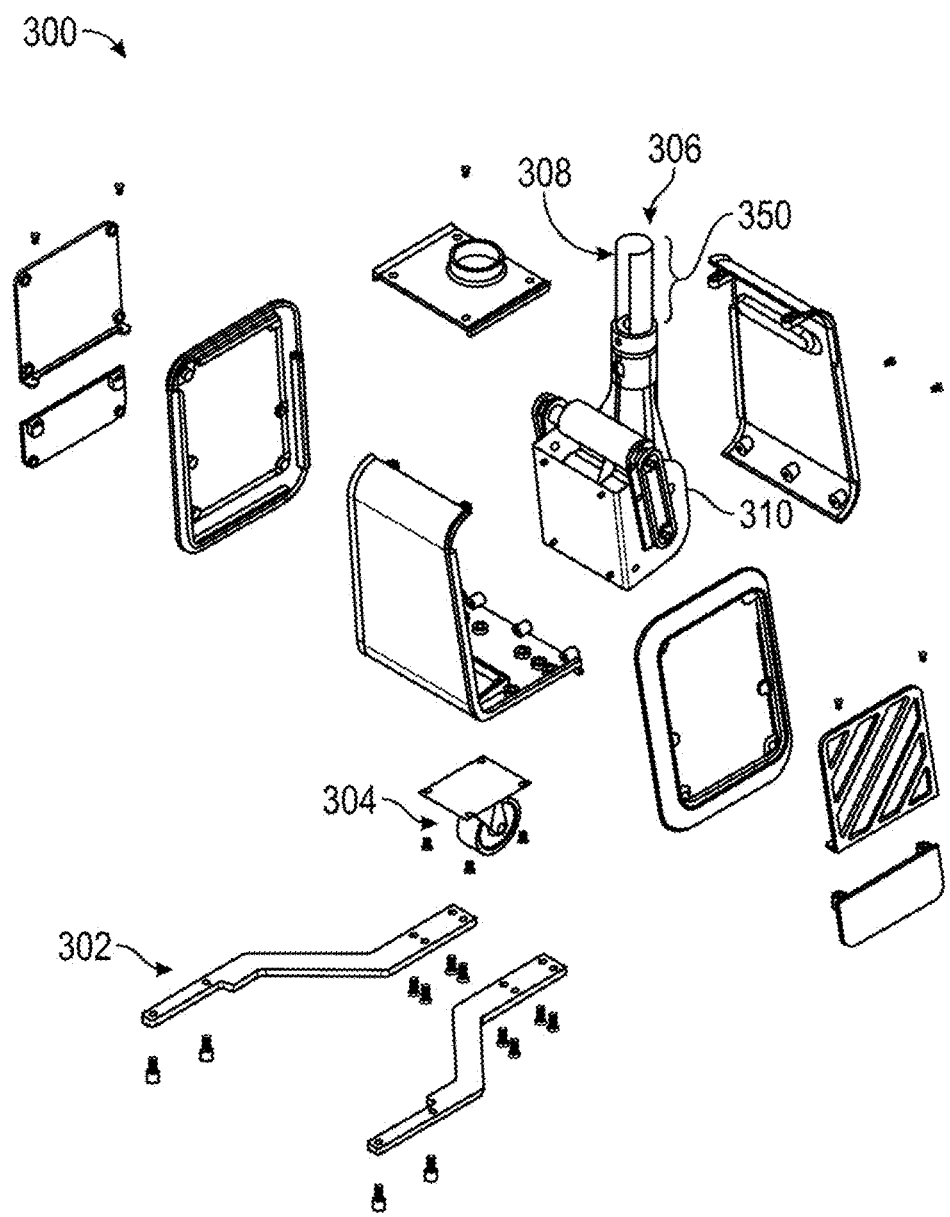
FIG. 4 is an exploded diagrammatic view of an actuator backpack assembly, according to at least one instance of the present disclosure.

FIG. 3 illustrates a diagrammatic view of a backpack assembly operable to be coupled with a robot assembly according to at least one instance of the present disclosure. FIG. 4 illustrates an exploded view of a backpack assembly operable to be coupled with a robot assembly according to at least one instance of the present disclosure. The backpack assembly 300 can operably couple with the robot assembly 100 via a bracket 302 (detailed more clearly with respect to FIG. 4). The bracket 302 can be releasably engaged with the robot assembly 100, thereby coupling/decoupling between the backpack assembly 300 and the robot assembly 100. The robot assembly 100, backpack assembly 300, and/or the bracket 302 can be coupled via threaded fasteners, press-fit fasteners, compression fasteners, and/or the like.

The backpack assembly 300 can have one or more wheels 304 operable to provide balance in conjunction with the plurality of wheels 106 of the robot assembly 100. The backpack assembly 300 may alter the balance and/or weight distribution of the robot assembly 100, thus the backpack assembly 300 can provide one or more wheels 304 to prevent loss of balance. The one or more wheels 304 can be a non-powered, pivotal wheel operable provide rolling support for the robot assembly 100 and/or the backpack assembly 300.

The backpack assembly 300 can have a telescoping arm 306 operable received therein. The telescoping arm 306 can be extended between a retracted length 308 (illustrated in FIG. 3) and a predetermined length 350 and/or any length therebetween. In at least one instance, the telescoping arm 306 can be formed by a rollotube arrangement in which the telescoping arm 306 is formed as the telescoping arm 306 is extended. The telescoping arm 306 can be formed by a roll of material 310 rolled along relative to a lateral axis, which is then extended through a rollotube collar, thereby rolling the material 310 along a longitudinal axis and forming the telescoping arm 306. The telescoping length 306 can extend the predetermined length 350 substantially equivalent to the longitudinal length of the roll of material 310. The material of the roll of material 310 and/or material thickness can be selected to provide suitable support to along the desired predetermined length 350.

Figure 5:
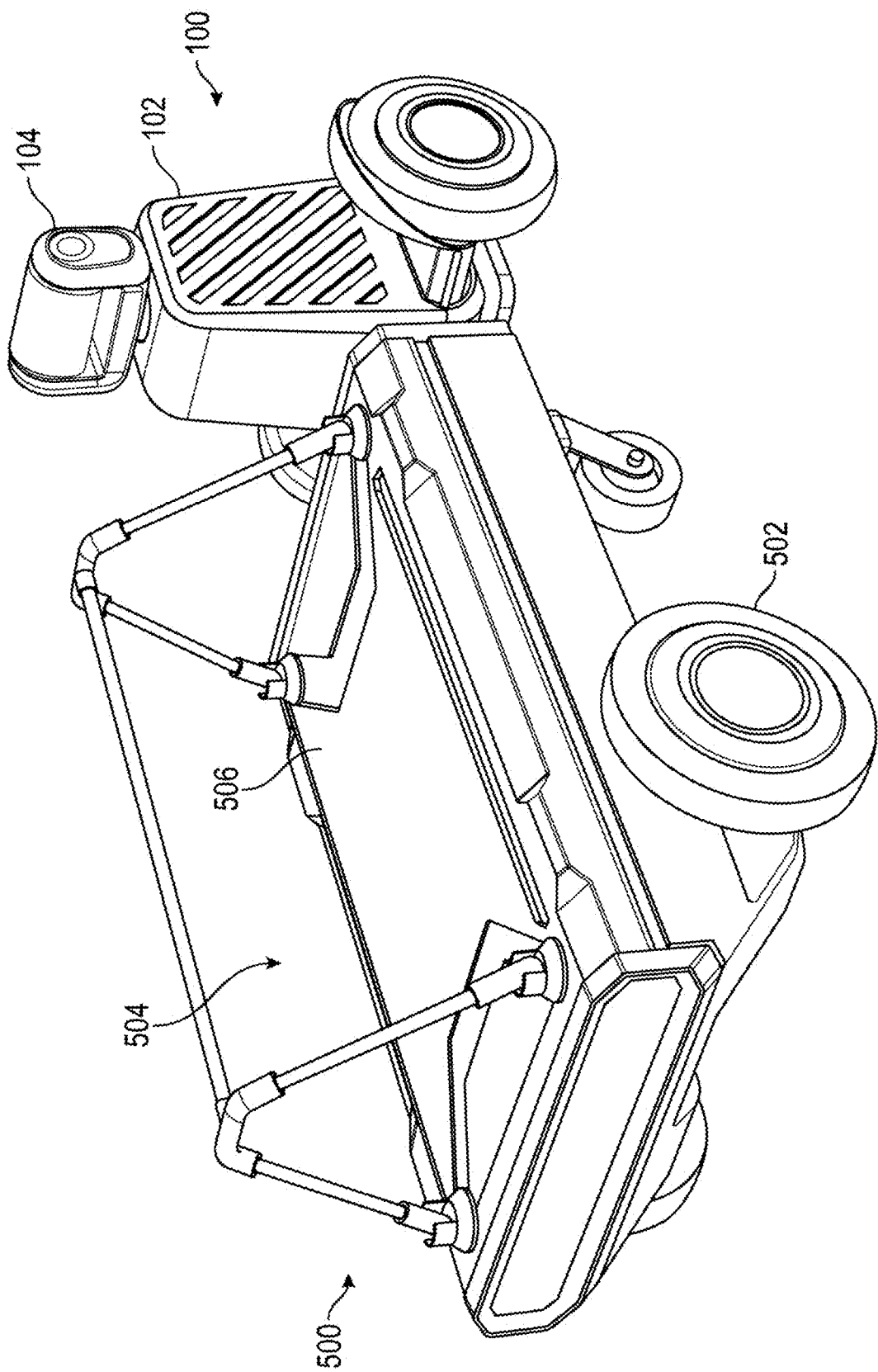
FIG. 5 is a diagrammatic view of a power bank trailer assembly, according to at least one instance of the present disclosure.

FIG. 5 illustrates a trailer assembly operable to be coupled with a robot assembly according to at least one instance of the present disclosure. The trailer assembly 500 can be operably coupled with a robot assembly 100, thereby providing transportation and/or cargo capacity. The trailer assembly 500 can be couplable with one or more accessories as discussed below with respect to FIGS. 7-8C. In at least one instance, the trailer assembly 500 can couple and/or decouple with the robot assembly 100 in a manner substantially similar to the backpack assembly 300 (detailed in FIGS. 3 and 4) implementing a releasably engageable bracket and/or hitch assembly, thereby coupling the trailer assembly 500 with the robot assembly 100. In other instances, the trailer assembly 500 can couple and/or decouple with the robot assembly 100 having a backpack assembly 300 coupled therewith via bracket and/or hitch assembly.

The trailer assembly 500 can have a plurality of wheels 502 operable to support and provide mobility to the trailer assembly 500. The plurality of wheels 502 can be powered and/or unpowered in conjunction with the robot assembly 100. In a powered arrangement, the plurality of wheels 502 of the trailer assembly 500 can be communicatively coupled with the plurality of wheels 106 of the robot assembly 100, thereby insuring proper rotational speed of the plurality of wheels 502 relative to the plurality of wheels 106 of the robot assembly 100. The trailer assembly 500 can have a receiving space 504 operable to receive cargo and/or one or more accessories (illustrated with respect to FIGS. 7-8C). The receiving space 504 can be an upper surface 506 of the trailer assembly 500. In some instances, the receiving space 504 can be recessed along the upper surface 506 of the trailer assembly 500. In other instances, the upper surface 506 can have a railing, barrier, and/or wall extending along a perimeter of the upper surface 506, thus forming receiving space 504.

The trailer assembly 500 can be operably coupled with the robot assembly 100 to increase the flexibility and/or usage for the robot assembly. The one or more accessories can provide storage, power, lighting, and/or the like. The one or more accessories can be storage arrangements operable to couple with at least a portion of the receiving space 504 and provide operable coupling with one or more specific items (e.g. paint buckets, paint supplies, cable spools, tools, etc.). While FIGS. 7-8C illustrate various instances of one or more accessories operable to implemented with the trailer assembly 500, it is within the scope of this disclosure to implement any number of accessories with the trailer assembly 500. Further, while the FIG. 5 illustrates one trailer assembly 500 coupled with a robot assembly 500 it is within the scope of this disclosure to implement any number of trailer assemblies 500 with a robot assembly 100 including, but not limited to, two trailer assemblies, three trailer assemblies, four trailer assemblies, five trailer assemblies, and/or any number of trailer assemblies. The plurality of trailer assemblies can be linked one to the other (e.g. in a train like manner).

Figure 6:
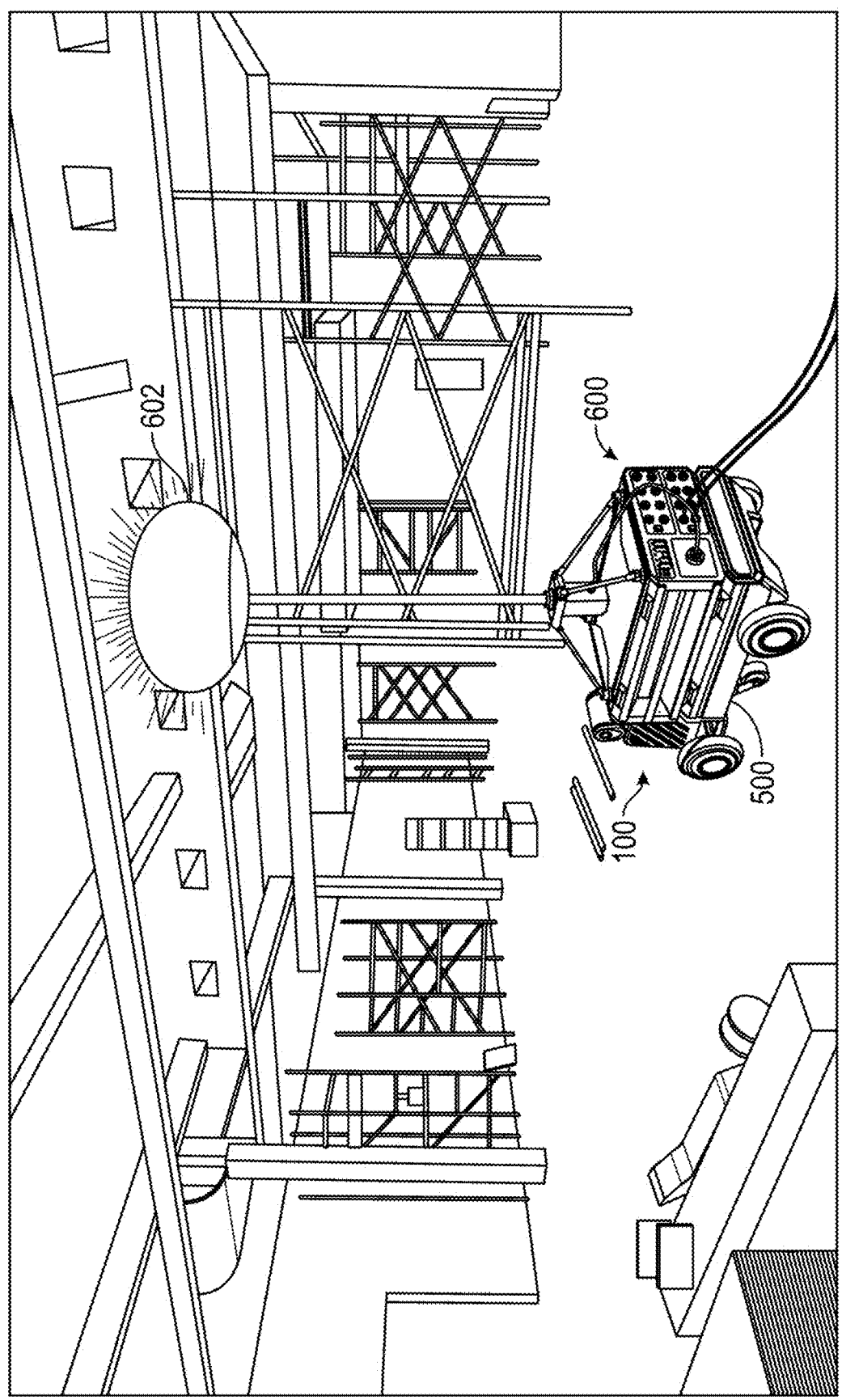
FIG. 6 is a diagrammatic view of a trailer assembly, according to at least one instance of the present disclosure.

FIG. 6 illustrates a trailer assembly having a power bank operably coupled therewith according to at least one instance of the present disclosure. The trailer assembly 500 can operably receive and/or couple with a power bank 600. The power bank 600 can be a power generation and/or a power storage system operably coupled with the trailer assembly 500 and/or the robot assembly.

In at least one instance of the present disclosure, the power bank 600 can be operable to generate and/or supply power via one or more electrical connections. The power bank 600 can couple with any electrical accessory including to at least the robot assembly 100, thereby increasing range and/or usage of the robot assembly 100. In some instances, the power generated by the power bank 600 can be inverted to provide a more stable alternating current (AC) for sensitive electronics. In other instances, the power bank 600 can generate AC power and/or direct current (DC) power. The power generation capability of the power bank can be any known power generation means including, but not limited to, gas, diesel, bio-fuels, solar, wind, and the like etc.

The power bank 600 can also provide a power storage arrangement. The power storage arrangement can include one or more battery cells (e.g. Lithium-ion) operable to store and/or provide power to one or more electrical accessories (e.g. light system). In at least one instance, the power storage arrangement can be charged separately via a power source. In other instances, the power storage arrangement can be charged by the power generation arrangement described above.

As can be appreciated in FIG. 6, a light system 602 can operable couple with and/or draw power from the power bank 600. The light system 602 can be controlled by an operator to illuminate at least a portion of a work area. As the robot assembly 100 can be operable to follow an operator, the light system 602 can be operable to illuminate a working area as the operator moves during a task. The light system 602 can be arranged to illuminate a broad area generally and/or be operable to provide a focused or spot lighting. The light system 602 direction and/or brightness can be adjusted by the operator depending on the task and/or environment.

Figure 7A:
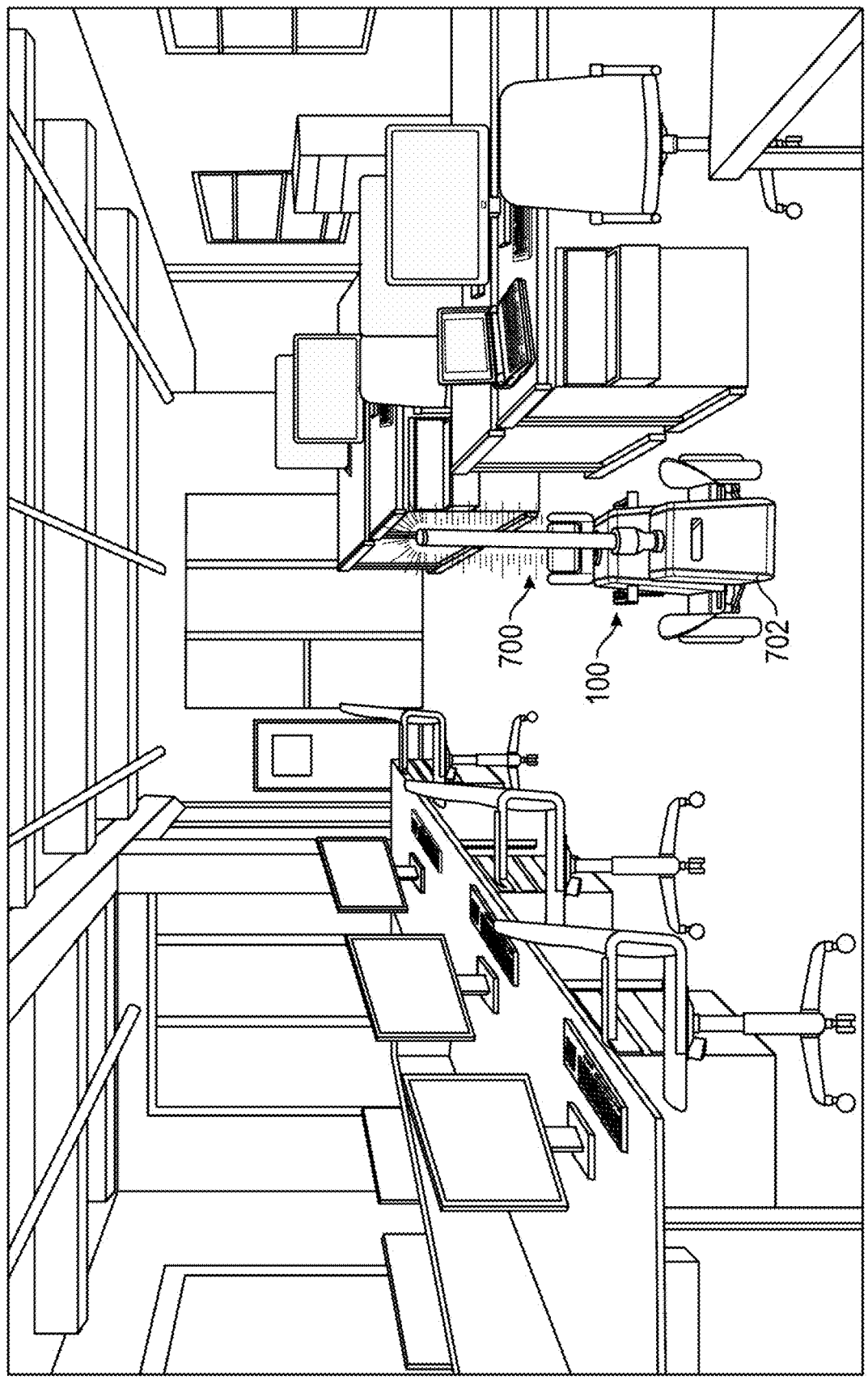
FIG. 7A is a diagrammatic view of a sanitation trailer assembly within an office space, according to at least one instance of the present disclosure.
Figure 7B:
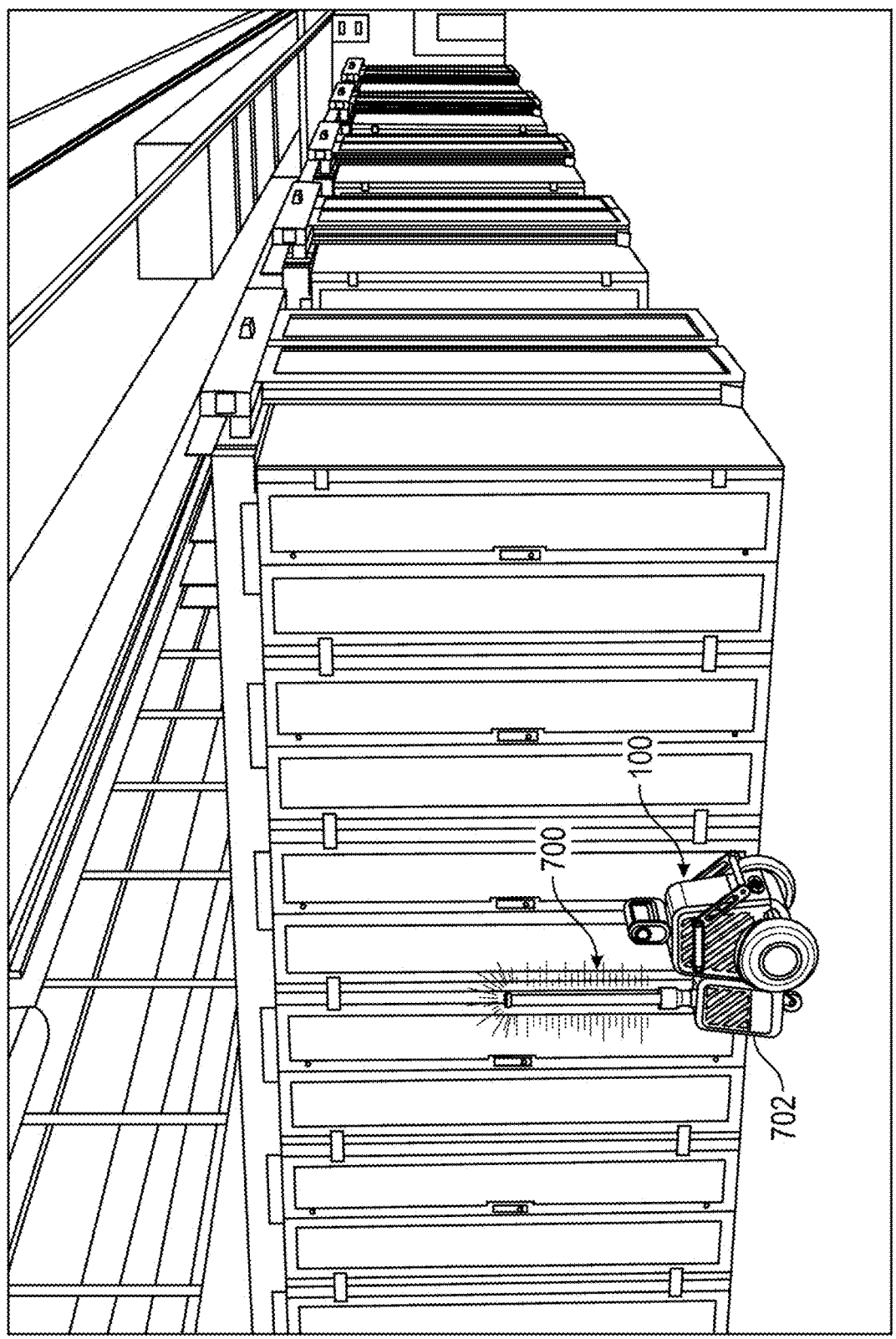
FIG. 7B is a diagrammatic view of a sanitation trailer assembly within an equipment space, according to at least one instance of the present disclosure.
Figure 7C:
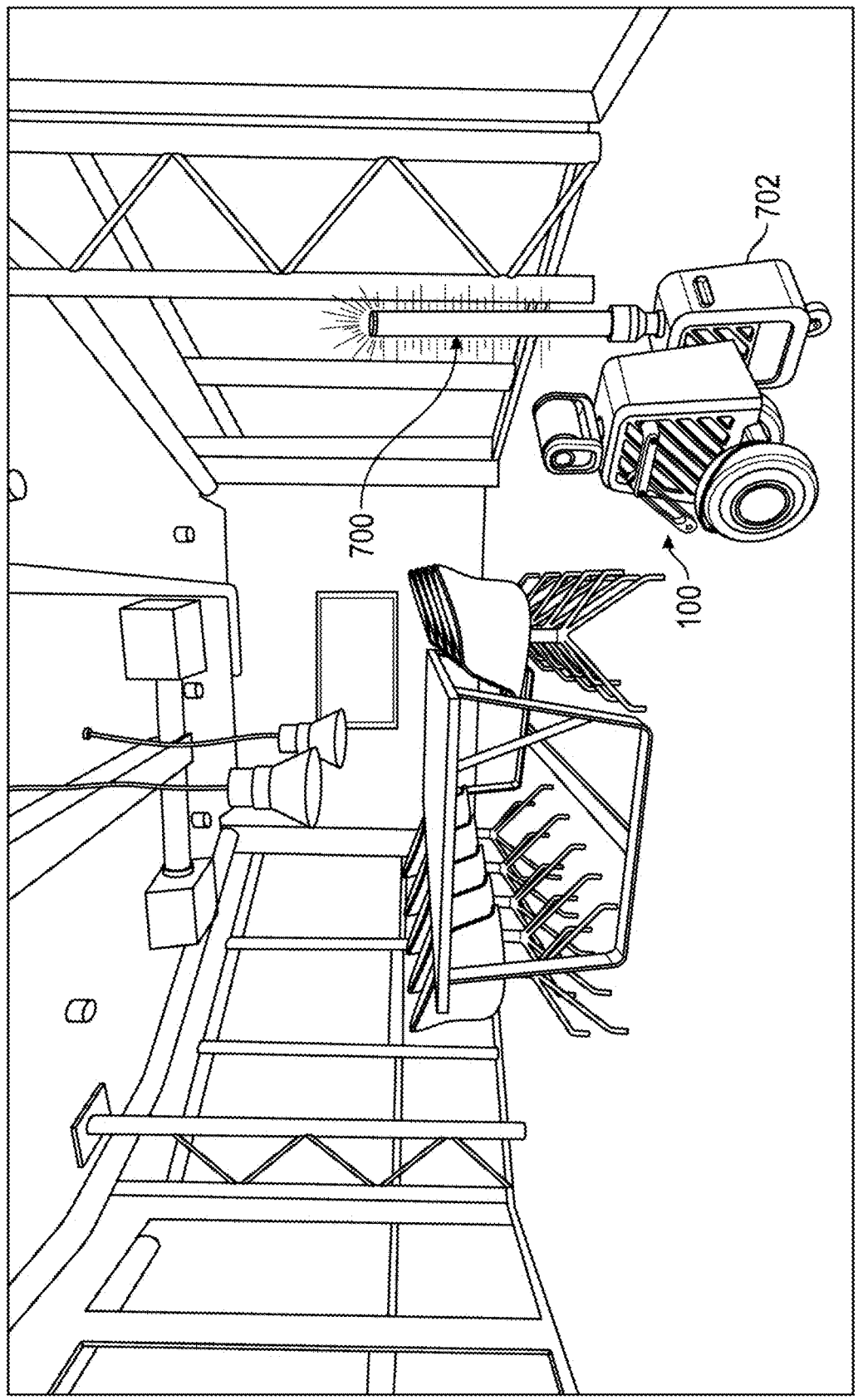
FIG. 7C is a diagrammatic view of a sanitation trailer assembly within a meeting space, according to at least one instance of the present disclosure.

FIG. 7A illustrates a sanitation trailer assembly within an office space according to at least one instance of the present disclosure. FIG. 7B illustrates a sanitation trailer assembly within an equipment space according to at least one instance of the present disclosure. FIG. 7C illustrates a sanitation trailer assembly within a meeting space, according to at least one instance of the present disclosure.

As can be appreciated in FIGS. 7A-7C, the robot assembly 100 can be operably coupled with a UV sanitation light 700 operable to sanitize rooms, surfaces, equipment, and the like. The UV sanitation light 700 can be arranged within a backpack assembly 300, trailer assembly 500, and/or coupled with a power bank 600. In at least one instance, the UV sanitation light 700 can incorporate an onboard power system 702, and thus operate independent of and/or in conjunction with the power bank 600. The onboard power system 702 can include one or more rechargeable battery cells operable to receive and/or store power.

The UV sanitation light 700 can be operable to disinfect and/or sanitize large areas, equipment, and/or commonly touched surfaces efficiently. The UV sanitation light 700 can be operable to emit light in the ultraviolet (UV) spectrum having a wavelength of approximately 100 nanometers (nm) to approximately 380 nm. In at least one instance, the UV sanitation light 700 can implement UV-C spectrum of approximately 200 nm to 280 nm to maximize germicidal effects.

The robot assembly 100 can navigate the UV sanitation light 700 to an optimal location within a previously mapped (and/or concurrently mapped) environment. Upon determination of proper positioning, the robot assembly 100 can communicate via wired and/or wireless communication to the UV sanitation light 700 to initiation a cleaning process. In at least one instance, the cleaning process can be a predetermined time period of UV light activation (e.g. 10 minutes) to sanitize the area. The robot assembly 100 and/or the UV sanitation light 700 can operable determine the position and/or positions within a mapped environment for one or more cleaning processes to ensure proper sanitation within the environment. In larger areas, multiple locations may be needed to effectively sanitize the environment, while in smaller areas a single location may be appropriate.

In some instances, the robot assembly 100 can be traverse through the environment during a cleaning process to ensure adequate exposure and sanitization of the environment. In this instance, the robot assembly 100 can maintain an appropriate travel speed to insure sufficient exposure of surfaces to the light emitted from the UV sanitation light 700.

Referring to FIG. 7A, the robot assembly 100 and UV sanitation light 700 can be deployed into an office space for nightly and/or regularly scheduled sanitation including, but not limited to, work spaces, door handles, common areas, and the like. The robot assembly 100 can follow a predetermined route based on a prior mapping of the environment and/or the robot assembly 100 can concurrently map and/or detect and avoid obstacles (e.g. desk chairs, etc.) during the cleaning process. The robot assembly 100 can maintain a predetermined pace during the traversing to ensure surfaces are exposed to UV light in sufficient duration to kill germs and/or otherwise sanitize surfaces.

Referring to FIG. 7B, the robot assembly 100 and UV sanitation light 700 can be deployed into an equipment space for nightly and/or regularly scheduled sanitation including, but not limited to, equipment casings, work spaces, door handles, and/or the like. The robot assembly 100 can follow a predetermined route based on a prior mapping of the environment and/or the robot assembly 100 can concurrently map and/or detect and avoid obstacles during the cleaning process. The robot assembly 100 can maintain a predetermined pace during the traversing to ensure surfaces are exposed to UV light in sufficient duration to kill germs and/or otherwise sanitize surfaces.

Referring to FIG. 7C, the robot assembly 100 and UV sanitation light 700 can be deployed into a meeting and/or conference room operable to sanitize and/or disinfect table, chairs, door handles, conference phones, and/or the like. Meeting and/or conference room spaces can be utilized for large gatherings with numerous people passing through during the course of a business day, and thus can have increased exposed to germs. In some instances, the robot assembly 100 and the UV sanitation light 700 can be implemented following use of the meeting and/or conference room and prior to the next scheduled use. In at least one implementation of this arrangement, the robot assembly 100 and the UV sanitation light 700 can be communicatively coupled with a meeting room schedule, thereby operably deploying upon completion of the schedule meeting and in advance of the next scheduled meeting. In other instances, the robot assembly 100 and the UV sanitation light 700 can be implemented on a predetermined schedule (e.g. nightly) to ensure regular sanitation practices.

While preferred examples of the present inventive concept have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

What is claimed is:

1. A robot assembly operable to couple to one or more accessories, the robot assembly comprising:
    a housing coupled with a plurality of wheels, the housing having a navigation system at least partially arranged therein;
    at least one electric motor operably coupled with the plurality of wheels;
    a telescoping arm;

a light system coupled with the telescoping arm, the light system operable to emit an ultraviolet light;

the navigation system having one or more sensors operably disposed within the housing, the navigation system including at least one processor and a memory operable to receive data from the one or more sensors and communicatively coupled with the at least one electric motor; and a releasably engageable connection point operable to couple with one or more accessories, wherein the one or more accessories are communicatively coupled with the navigation system, wherein the navigation system is operable to:
obtain a mapped environment of at least a portion of a surrounding environment;
determine a position of the housing and/or the one or more accessories within the mapped environment;
determine one or more surfaces within the mapped environment to be sanitized;
move the robot assembly to a first surface of the one or more surfaces;
adjust the telescoping arm along a vertical axis to align the light system with the first surface and cause the light system to emit the ultraviolet light onto the first surface for a predetermined time to effectively sanitize the first surface;
adjust a travel speed to expose the first surface to the ultraviolet light for the predetermined period of time;
upon being within a predetermined distance from a second surface of the one or more surfaces, adjust the telescoping arm along the vertical axis to align the light system with the second surface and cause the light system to emit the ultraviolet light onto the second surface for the predetermined time to effectively sanitize the second surface;
adjust the travel speed to expose the second surface to the ultraviolet light for the predetermined period of time.

2. The robot assembly of claim 1, wherein the navigation system is further operable to: store, in the memory, the mapped environment and/or the position of within the mapped environment.

3. The robot assembly of claim 2, wherein the navigation system is further operable to: obtain the mapped environment and/or the position within the mapped environment from the memory.

4. The robot assembly of claim 1, wherein the navigation system obtains the mapped environment by scanning at least a portion of the surrounding environment with the one or more sensors.

5. The robot assembly of claim 1, wherein the navigation system is operable to maintain a predetermined distance between the robot assembly and an operator within the mapped environment.

6. The robot assembly of claim 5, wherein the predetermined distance is adjustable by the operator.

7. The robot assembly of claim 5, wherein the predetermined distance is a linear distance.

8. The robot assembly of claim 5, wherein the predetermined distance is non-linear.

9. The robot assembly of claim 1, wherein the one or more accessory is a backpack assembly, and the backpack assembly has a retractable telescoping arm.

10. The robot assembly of claim 9, wherein the retractable telescoping arm is a rollotube arrangement.

11. The robot assembly of claim 1, wherein the one or more accessories includes a power bank includes at least one of a rechargeable array of battery cells and/or a power generation source.

12. The robot assembly of claim 11, wherein the power generation source is operable to charge the array of battery cells.

13. The robot assembly of claim 11, wherein the one or more accessories includes the light system operable to produce the ultraviolet light having a wavelength of 200 nm to 280 nm.

14. The robot assembly of claim 13, wherein the navigation system is further operable to determine one or more locations within the mapped environment to activate the light system for the predetermined period of time, wherein when the activated light system is operable to produce ultraviolet light.

15. The robot assembly of claim 14, wherein the navigation system is further operable to determine a predetermined path through the mapped environment, wherein the light system is operable to produce ultraviolet light along the predetermined path.

16. A method of operating a personal robot assembly, the method comprising:
obtaining, via a navigation system of a personal robot assembly, a mapped environment of at least a portion of a surrounding environment, wherein the navigation system of the personal robot assembly includes at least one processor, memory, and one or more sensors communicatively coupled therewith;
determining a position of the personal robot assembly within the mapped environment;
determining a path within the mapped environment relative to an operator and/or one or more accessories coupled with the personal robot assembly via a releasably engageable connection point;
determining a travel speed within the mapped environment relative to an operator and/or the one or more accessories;
determining one or more surfaces within the mapped environment to be sanitized;
moving the personal robot assembly to a first surface of the one or more surfaces;
adjusting a telescoping arm along a vertical axis to align a light system with the first surface;
emitting, by the light system, the ultraviolet light onto the first surface for a predetermined time to effectively sanitize the first surface;
adjusting a travel speed to expose the first surface to the ultraviolet light for the predetermined period of time;
upon being within a predetermined distance from a second surface of the one or more surfaces, adjusting the telescoping arm along the vertical axis to align the light system with the second surface and cause the light system to emit the ultraviolet light onto the second surface for the predetermined time to effectively sanitize the second surface;
adjusting the travel speed to expose the second surface to the ultraviolet light for the predetermined period of time.

17. The method of claim 16, wherein the path is determined relative to the operator's travel path within the surrounding environment and the travel speed is determined relative to the operators travel speed within the surrounding environment.

18. The method of claim 16, further comprising determine one or more activation points of the one or more accessories based on the mapped environment and/or the position within the mapped environment.

19. The method of claim 16, wherein the path is determined relative to the one or more accessories and the mapped environment is obtained from memory.

* * * * *